United States Patent [19]

Oya

[11] Patent Number: 4,694,359
[45] Date of Patent: Sep. 15, 1987

[54] DIAGNOSTIC DISK FOR CHECKING THE HEAD ALIGNMENT OF MAGNETIC DISK DRIVES

[75] Inventor: Takeo Oya, Tokyo, Japan
[73] Assignee: NEC Corporation, Tokyo, Japan
[21] Appl. No.: 827,689
[22] Filed: Feb. 10, 1986
[30] Foreign Application Priority Data Feb. 8, 1985 [JP] Japan .................................. 60-22889
Feb. 14, 1985 [JP] Japan .................................. 60-27088

[51] Int. Cl.$^4$ .................................................. G11B 5/56
[52] U.S. Cl. ..................................................... 360/76
[58] Field of Search .............................. 360/75, 76, 135

[56] References Cited

U.S. PATENT DOCUMENTS 4,513,331 4/1985 Baker et al. .......................... 360/75
4,513,333 4/1985 Young et al. .......................... 360/77

FOREIGN PATENT DOCUMENTS 58-68222 4/1983 Japan ..................................... 360/77

Primary Examiner—George G. Stellar
Attorney, Agent, or Firm—Sughrue, Mion, Zinn, Macpeak, and Seas

[57] ABSTRACT

A method and apparatus for checking the azimuthal alignment of the magnetic head of a disk drive with respect to a standard head alignment by use of diagnostic disk having plural sectors along a checking track. The sectors include an identification field, a data field and noise areas adjacent to the data field. The patterns recorded in the respective data field and adjacent noise fields being at relative azimuthal angles.

7 Claims, 21 Drawing Figures

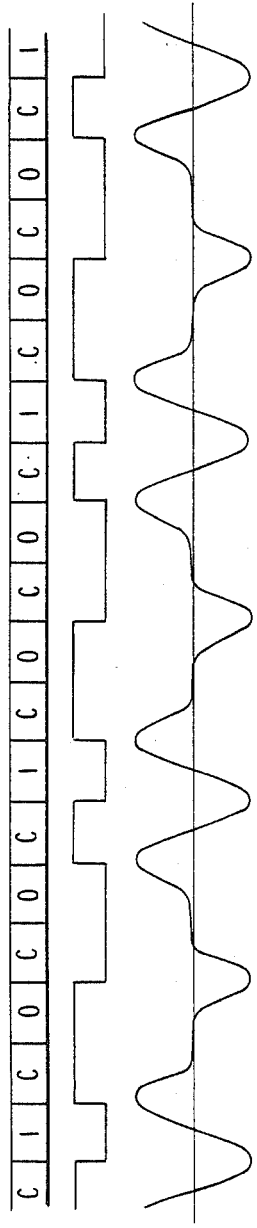
FIG.5A
FIG.5B
FIG.5C
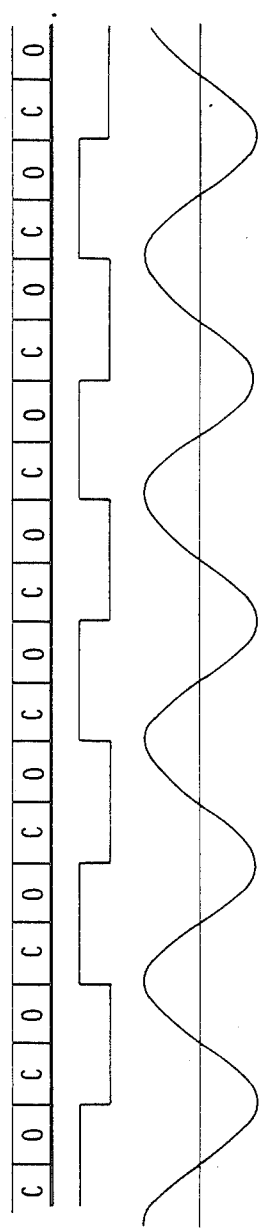
FIG.5D
FIG.5E
FIG.5E
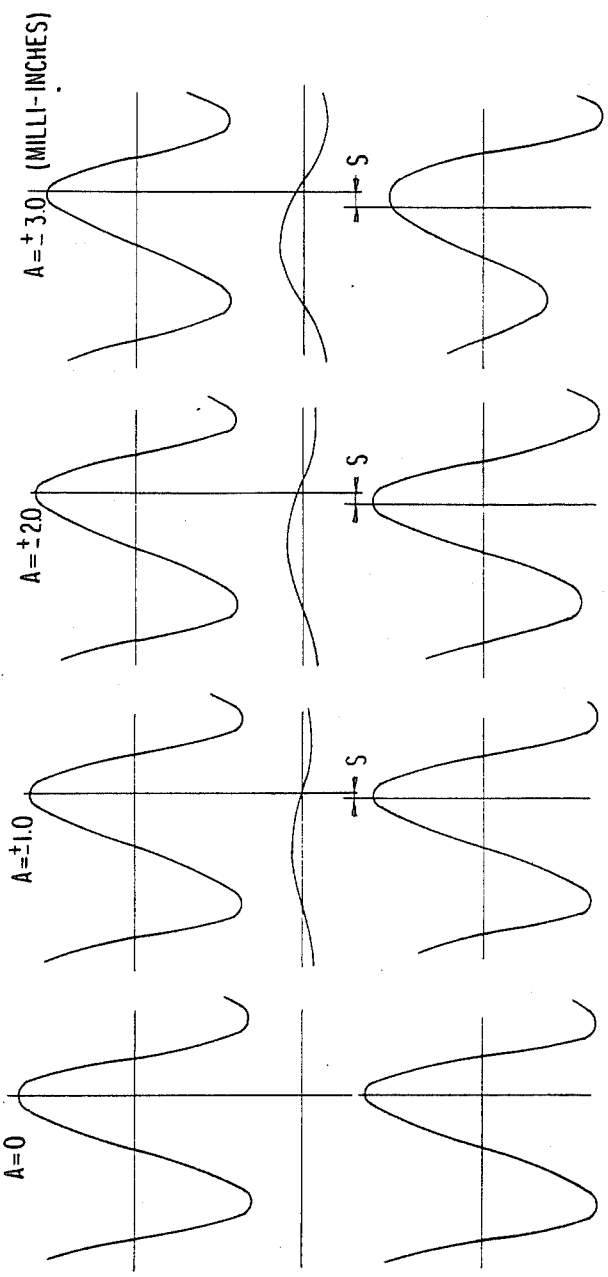
FIG.6A (DATA FIELD)
FIG.6B (NOISE AREA)
FIG.6C

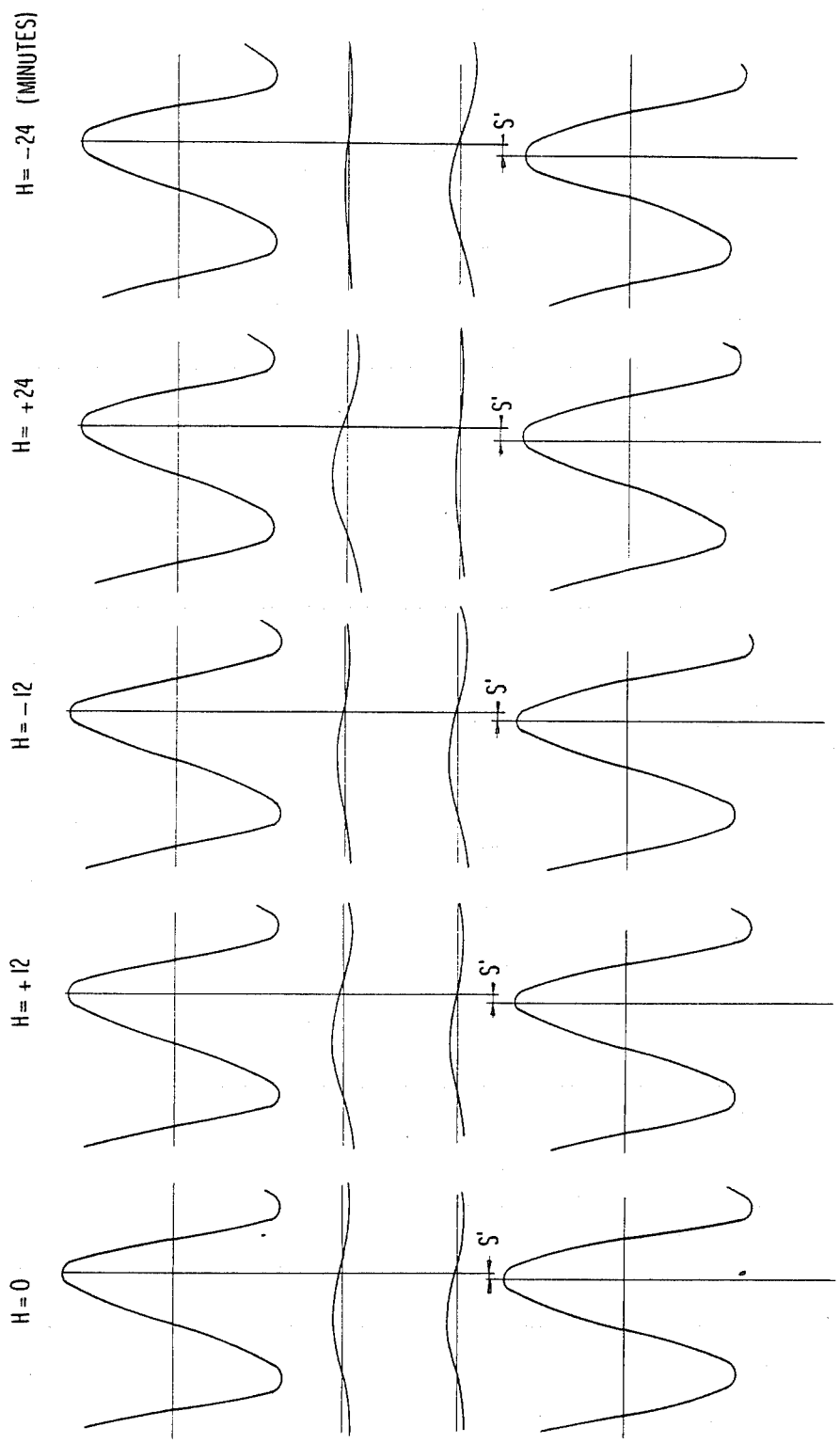

DIAGNOSTIC DISK FOR CHECKING THE HEAD ALIGNMENT OF MAGNETIC DISK DRIVES

BACKGROUND OF THE INVENTION

The present invention relates to magnetic disk drives designed for use with exchangeable recording media, and more particularly to a diagnostic disk for checking the radial misalignment and the azimuthal misalignment of a magnetic head of such disk drives.

A magnetic disk drive controls writing and reading operation to and from an exchangeable recording medium such as a flexible disk (floppy disk). The disk drive has a motor-driven spindle for rotating the recording medium, a clamping mechanism for securing or releasing the recording medium to or from the spindle, a magnetic head for writing and reading information to and from medium, and a head-positioning assembly for moving the magnetic head in the radial direction of the recording medium to position the magnetic head at a distination track on the recording medium.

The disk drive is required to read such information from the recording medium that was recorded thereon by means of another disk drive. Accordingly, the head-positioning assembly in every disk drive should locate the magnetic head precisely at the absolute positions for all the tracks. Additionally, the transducer gap of the magnetic head should be perpendicular to the track center line. If the magnetic head radially deviates from the recording track or azimuthally deviates from the perpendicular line to the track center line, the amplitude of the output signal from the magnetic head may be so reduced that it cannot be recognized as the data. Thus, the disk drive without precise head alignment cannot read correctly the data which was recorded by the disk drive with precise head alignment, and vice versa.

The misalignment of the head is caused by a shock during shipment of the disk drive, and therefore, the head alignment is desired to be checked after settling of the disk drive.

For the purpose of checking the head alignment, a diagnostic disk is proposed in U.S. Pat. No. 4,513,331, entitled "METHOD AND APPARATUS FOR DISK DRIVE ALIGNMENT". The diagnostic disk includes progressively offset tracks for measuring the radial alignment of the magnetic head with respect to the track center line, and azimuth tracks for checking the azimathal angle of the transducer gap of the magnetic head with respect to the perpendicular line of the track center line.

The progressively offset track and the azimuth track are divided into a plurality of sectors, each having a sector identification field and a sector data field. In the progressively offset track, the sector data fields are progressively and alternatevely offset from the track center line in the inward or outward direction of the disk by an increasing value. That is, the proportion of a blank area in which no data is recorded gradually increases in the head read path of a perfectly aligned head in relation to the increment of the sector number. On the other hand, in the azimuth track, each of the sector data fields is recorded at an individual azimuth angle determined in correspondence to the sector number. The sector data are alternatively recorded at positive and negative angles with their absolute values gradually increasing in relation to the increment of the sector number. The data fields have a width equal to the track width.

In operation, the radial alignment of the magnetic head is measured by reading the progressively offset track, and then, detecting the identification field of the sector in which the sector data field can be recognized as the predetermined data. Similarly, the azimuth angle is measured by reading the azimuth track, and then, detecting the identification field of the sector to which the readable sector data belongs.

However, it is impossible with the prior art diagnostic disk to detect finely the values of the radial misalignment and the azimuth misaligned angle of the head, because the read/write circuit of the disk drive recognizes the output signal from the head only when the head offsets radially to a relatively great extent deflects head azimuthally to a relatively large range, both with respect to the data track. For instance, the output signal from a head can be recognized only when the head is radially deflected from a track center line by 6 milli-inches or more or azimuthally deflected from a perpendicular line to a track center line by 40 minutes or more. In other words, the radial and azimuthal deflection cannot be detected at the precision less than $\pm 6$ milli-inch and $\pm 40$ minutes.

SUMMARY OF THE INVENTION

Therefore, an object of the present invention is to provide diagnostic disk capable of measuring a radial alignment and azimuthal alignment of the magnetic head with high precision.

According to the present invention, a diagnostic disk for checking a magnetic head alignment of a magnetic disk drive, which has a rotating means for rotating said diagnostic disk with a radially central portion of said diagnostic disk as the center of rotation whereby a concentric ideal head read path is provided on a surface of said diagnostic disk by the standard head alignment, comprises a concentric checking track provided on the ideal head read path and divided into a plurality of sectors, each of the sectors including an identification field for recording a sector number identifying the sector, the identification field having substantially the same width as the ideal head read path in the radial direction of the diagnostic disk and the sector number being recorded at an angle perpendicular to said radial direction, a data field for recording a predetermined data pattern, the data pattern being recorded with a deviation with respect to the standard head alignment, and noise areas for recording a predetermined noise pattern different from the data pattern, the noise areas being located at both sides of the data field in said radial direction.

BRIEF DESCRIPTION OF THE DRAWINGS

The above-mentioned and other objects, features and advantages of the present invention will be better understood from the following detailed description of a preferred embodiment of the present invention taken in conjunction with the accompanying drawings, wherein;

FIGS. 5A to 5F are wave from diagrams showing recording signals recorded in the progressive offset track shown in FIGS. 3 and 4;

FIGS. 6A to 6C illustrate reading signals from the progressive offset track shown in FIGS. 3 and 4;

FIGS. 10A to 10D illustrate reading signals from the azimuth track shown in FIGS. 8 and 9.

DESCRIPTION OF THE PREFERRED EMBODIMENT

Figure 1:
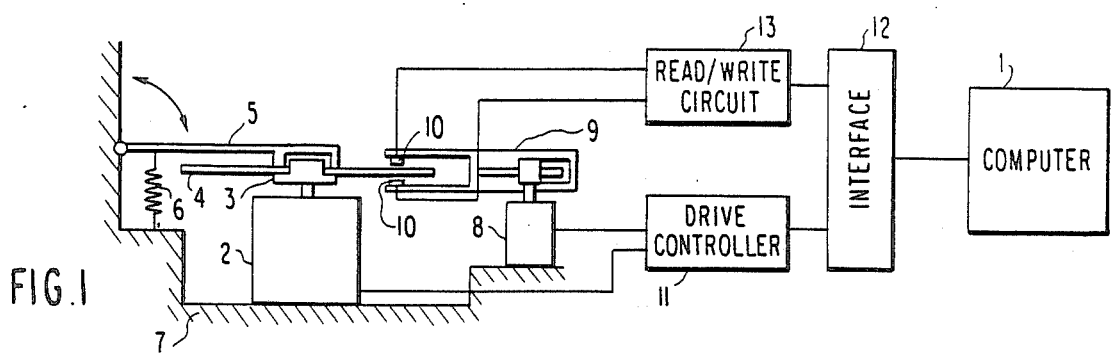
FIG. 1 is a schematic block diagram showing a floppy disk drive.

FIG. 1 is a schematic block diagram showing the major components of a floppy disk drive connected to a computer 1. The disk drive is provided with a motor 2 for rotating a spindle 3 on which a floppy disk 4 is set. The floppy disk 4 is rotatably secured to the spindle 3 by a clamping mechanism 5 which is urged in the clockwise direction by a spring 6. The clamping mechanism 5 is rotatably secured to a flame 7 to remove from the spindle 5 when the floppy disk 4 is exchanged.

A stepping motor 8 is provided for linearly moving a carrier member 9 in the radial direction of the floppy disk 4. Magnetic heads 10 are mounted on the carrier member 9 so that its transducer gap is located on a destination track on the floppy disk 4 by the liner movement of the carrier member 9.

A disk drive controller 11 controls the rotational speed of the motor 2 in a constant speed. The drive controller 11 further controls the rotational angle and the rotational direction of the stepping motor 8 to position the magnetic heads 10 at a destination track in accordance with the seek command send by the computer 1 via a interface circuit 12.

A read/write circuit 13 is connected to the magnetic heads 10 to supply a recording signal thereto and to receive a reading signal therefrom. The recording signal is generated in accordance with the recording data sent from the computer 1 with write permission signal, and then, recorded at the sector indicated by the computer 1.

After the positioning operation at a distination track, the reading signal is always applied to the read/write circuit 3. The computer 1 designates one or more sector identification numbers indicating one or more sector in which the desired data is recorded. The read/write circuit 3 reads the data from the identification field in the reading signal to search a destination sector. If the identification field data corresponds to the designated identification number, the read/write circuit 3 reads the data from the sector data field following the identification field, and sends the data to the computer 1.

Figure 2:
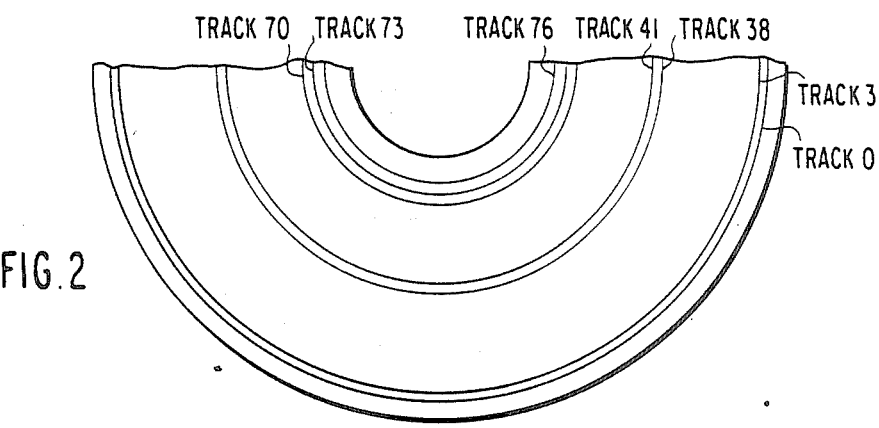
FIG. 2 is a plan view of a diagnostic disk according to an embodiment of the present invention.

FIG. 2 is a partial schematic plan view of a diagnostic disk according to an embodiment of the present invention. The diagnostic disk 20 is used for checking a magnetic head alignment of floppy disk drives for 8-inch floppy disks with the recording density of 48 TPI (Track per Inch). The diagnostic disk 20 is set in the disk drive shown in FIG. 1 instead of the floppy disk 4.

The diagnostic disk 20 is provided with a plurality of concentric tracks of TRACK 0 to TRACK 76. Progressive offset tracks for measuring an amount of radial misalignment of the magnetic head 10 are allotted at TRACK 0, TRACK 3, TRACK 38, TRACK 41, TRACK 70 and TRACK 73. An azimuth track is allotted at TRACK 76. Index format tracks, timing tracks, alternate offset tracks and user area are allotted at the other tracks similarly to the conventional diagnostic disk disclosed in the above-described U.S. Pat. No. 4,513,331.

Figure 3:
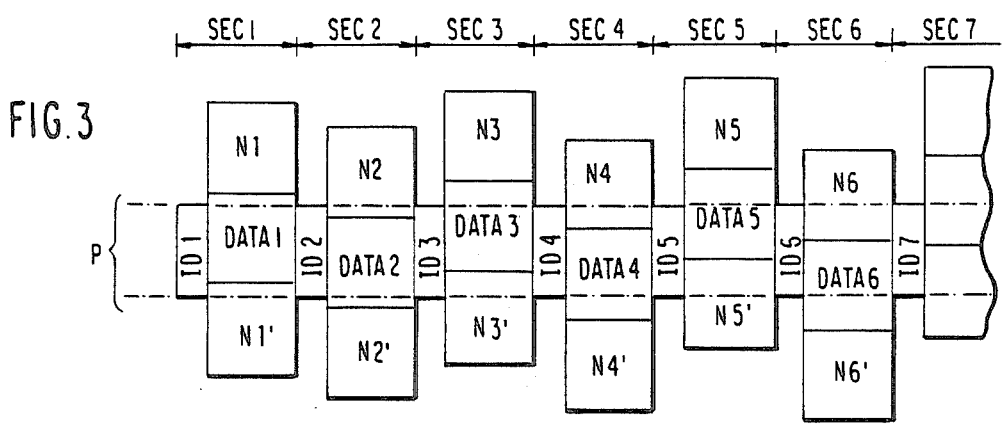
FIGS. 3 and 4 illustrate a progressive offset track allotted in the diagnostic disk shown in FIG. 2.

FIG. 3 illustrates in schematic form a linearized version of the first seven sectors of the progressive offset track allotted at TRACK 73. A couple of sectors are enlargely illustrated in FIG. 4.

The progressive track is circumferentially divided into 26 sectors SEC 1 to SEC 26. Each of the sectors SEC 1 to SEC 26 has a sector identification (ID) field IDi and a sector data field DATAi following the ID field IDi. The ID fields ID 1 to ID 26 are precisely lined up on the 12 milli-inches wide head read path P of a perfectly aligned magnetic head in the radial direction. The width of the ID fields IDi is the same as that of the head path P.

The data fields DATA 1 to DATA 26 have the same width $W_d$ as the head path P (12 milli-inches). They are progressively offset in alternating positive (radially inward to the disk 20) and negative (radially outward to the disk 20) directions by an increasing offset value. That is, the first data field DATA 1 is positively offset with its offset value $l_1$ of +0.5 milli-inches with respect to the head path P, the second data field DATA 2 is negatively offset with its offset value $l_2$ of −0.5 milli-inches, the third data field DATA 3 is positively offset with its offset value $l_3$ of +1.0 milli-inch, the fourth data field DATA 4 is negatively offset with its offset value $l_4$ of −1.0 milli-inches, and so on. Thus, the even sectors SEC 1, SEC 3, . . . , SEC 25 are positively offset by an increasing value +0.5 mill-inches, and the odd sectors SEC 2, SEC 4, . . . , SEC 26 are negatively offset by an increasing value −0.5 milli-inches.

The relationship between the sector numbers and the offset values of the data field is as follows:

| Sector Number | Offset in Milli-inches |
| --- | --- |
| 1 | +0.5 |
| 2 | −0.5 |
| 3 | +1.0 |
| 4 | −1.0 |
| 5 | +1.5 |
| 6 | −1.5 |
| 7 | +2.0 |
| 8 | −2.0 |
| 9 | +2.5 |
| 10 | −2.5 |
| 11 | +3.0 |
| 12 | −3.0 |
| 13 | +3.5 |
| 14 | −3.5 |
| 15 | +4.0 |
| 16 | −4.0 |
| 17 | +4.5 |
| 18 | −4.5 |
| 19 | +5.0 |
| 20 | −5.0 |
| 21 | +5.5 |
| 22 | −5.5 |
| 23 | +6.0 |
| 24 | −6.0 |
| 25 | +6.5 |
| 26 | −6.5 |

Positive and negative noise areas $N_i$ and $N_i'$ are arranged at both sides of the data field DATAi in the radially inward and outward direction of the diagnostic disk 20. The widths $W_n$ of the noise areas are the same as that $W_d$ of the data field DATAi (12 milli-inches). It is noted that both sides of the ID field IDi are erased.

In the ID field IDi, a sector identification number followed its check code CRC is recorded to indicate each of the sectors in the conventional manner. In all of the data fields DATAi, a predetermined data pattern is recorded with its check code CRC. For instance, the repetition of the pattern "100100 . . . " shown in FIG. 5A is recorded in the data field DATAi as the data pattern. In accordance with the frequency modulation (FM), this data pattern is transformed to the recording signal having the wave form in which the highest frequency (250 Hz) and the lowest frequency (125 Hz) are repeated as shown in FIGS. 5B and 5C.

In all of the noise area Ni, a predetermined noise pattern, for instance, all "0" pattern shown in FIG. 5D, is recorded. This noise pattern is transformed to the recording signal having the wave form in which the lowest frequency (125 Hz) is repeated as shown in FIGS. 5E and 5F.

FIGS. 6A to 6C show reading signals from the progressive offset track read by the magnetic head with the various offset value A with respect to the data field. As shown in FIG. 6A, the output level of the data signal from the data field DATAi is decreased in accordance with the increment of the offset value A. Conversely, the output level of the noise signal is increased in accordance with the increment of the offset value A as shown in FIG. 6B. The reading signal of the head has the wave form shown in FIG. 6C, which is obtained by compounding the data signal (FIG. 6A) and the noise signal (FIG. 6B). Since the noise pattern is different from the data pattern and the wave form of the data pattern is distorted by the noise pattern, the peak shift S is occurred in the reading signal (FIG. 6C).

The read/write circuit 13 shown in FIG. 1 detects the peaks of the reading signal and transforms them as a digital signal. However, if the amount of the peak shift is greater than a threshold level, the read/write circuit 13 transforms the reading signal to a wrong digital data.

By using the diagnostic disk having the progressive offset track shown in FIG. 3, the peak shift S is obtained in greater value than by using the conventional diagnostic disk due to the noise signal. Accordingly, the reading error is occurred by a smaller offset of the magnetic head. On the other hand, the ID fields IDi can be recognized even if the head is offset in relatively large value since no noise areas are provided at both side of the ID fields IDi.

Figure 7:
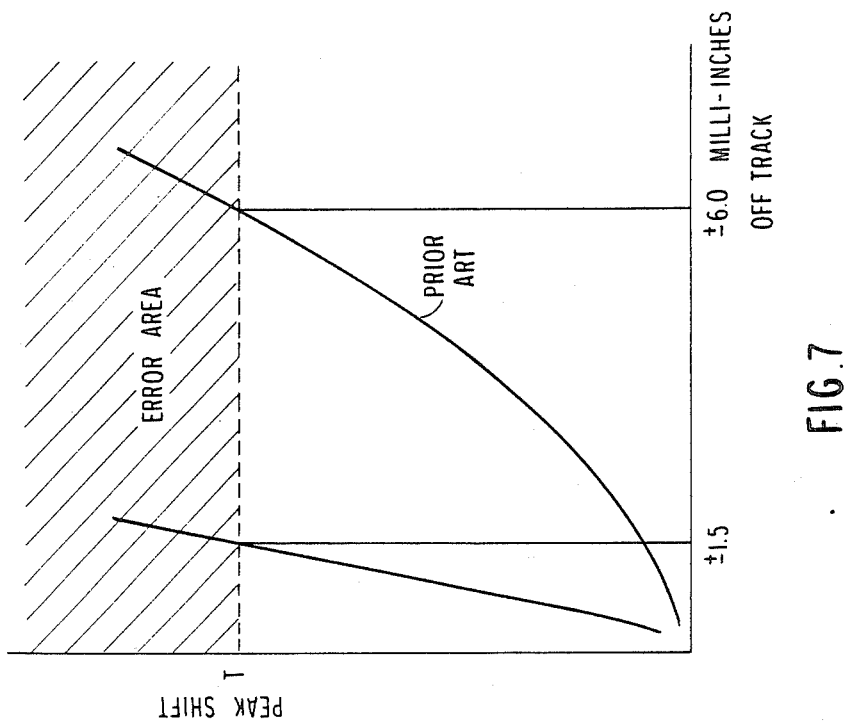
FIG. 7 illustrates a relationship between a head offset and a peak shift.

As shown in FIG. 7, the peak shift S reaches the threshold level T when the head offset in the radial direction is ±1.5 milli-inches by using the diagnostic disk having the progressive offset track shown in FIG. 3. On the other hand, by using the conventional diagnostic disk, the amount of the head offset enabling the peak shift to be the threshold level T is ±6 milli-inches. It shows the misalignment of the magnetic head in the radial direction can be detected with high precision by the progressive offset track shown in FIG. 3.

Figure 8:
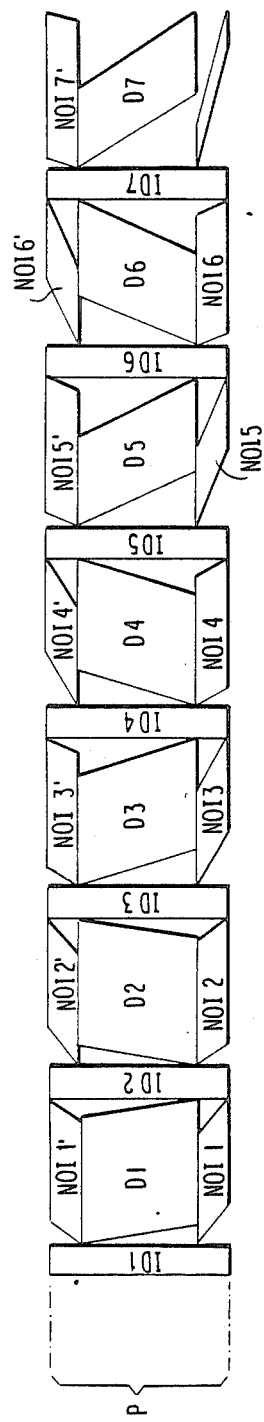
FIGS. 8 and 9 illustrate a azimuth track allotted in the diagnostic disk shown in FIG. 2.
Figure 9:
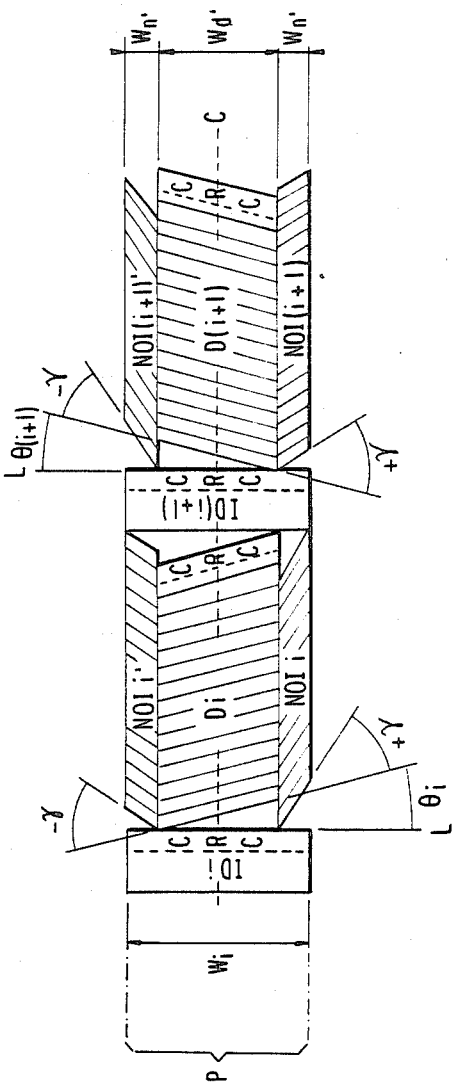

FIG. 8 illustrates in schematic form a linearized version of the first seven sectors of the azimuth track allotted at TRACK 76. A couple of sectors are enlargely illustrated in FIG. 9.

The azimuth track is circumferentially divided into 26 sectors SEC 1 to SEC 26. Each of the sectors SEC 1 to SEC 26 has a sector identification (ID) field IDi and a sector data field Di following the ID field. The ID fields ID 1 to ID 26 have a width $W_i$ equal to that of a head read path P (12 milli-inches) and are arranged perpendicular to a track center line C. The data fields Di have a width $W_d'$ narrower than that of the head read path P, i.e., the width $W_{d'}$ is 4/5 times the width $W_i$. The data fields Di are arranged with its center line in the track direction being on the track center line C.

A predetermined data pattern is recorded in the data field Di at an individual azimuthal angle $\theta_i$ with respect to a line L perpendicular to the track center line C. Additionally, the data recorded in the even data fields D1, D3, . . . , D25 have a positive (counterclockwise direction in the FIGS.) azimuthal angle $\theta_1, \theta_3, \ldots, \theta_{25}$, respectively, to the perpendicular line L by an increasing value of +2 minutes, while the data in the odd fields D2, D4, . . . , D26 have a negative (clockwise direction) azimuthal angle $\theta_2, \theta_4, \ldots, \theta_{26}$, respectively, to the line L by an increasing value of −2 minutes. That is, the data is recorded in the data field D1 at an azimuthal angle of +2 minutes, in the data field D2 at an angle of −2 minutes, in the data field D3 at an angle of +4 minutes, in the data field D4 at angle of −4 minutes, and so on. The relationship between the sector numbers and the aximuthal angles of the data fields is as follows:

| Sector Number | Azimuth in Minutes |
| --- | --- |
| 1 | +2 |
| 2 | −2 |
| 3 | +4 |
| 4 | −4 |
| 5 | +6 |
| 6 | −6 |
| 7 | +8 |
| 8 | −8 |
| 9 | +10 |
| 10 | −10 |
| 11 | +12 |
| 12 | −12 |
| 13 | +14 |
| 14 | −14 |
| 15 | +16 |
| 16 | −16 |
| 17 | +18 |
| 18 | −18 |
| 19 | +20 |
| 20 | −20 |
| 21 | +22 |
| 22 | −22 |
| 23 | +24 |
| 24 | −24 |
| 25 | +26 |
| 26 | −26 |

At both sides of the data field $D_i$, positive and negative noise areas $NOI_i$ and $NOI_{i'}$ are provided. Both the noise fields $NOI_i$ and $NOI_{i'}$ have a width $W_{n'}$ which is 1/10 times the width $W_i$ of the ID field $ID_i$. Accordingly, the sum of the widths $W_{d'}$ and $2W_{n'}$ is the same as the width $W_i$. The positive noise area $NOI_i$ have a positive azimuthal angle $\gamma$ with respect to the data field $D_i$ while the negative noise area $NOI_{i'}$ has a negative azimuthal angle $-\gamma$ with respect to the data field $D_i$. The angles $\gamma$ and $-\gamma$ are the same absolute value, and constant for all of the sectors. That is, the noise signal is recorded in the noise area $NOI_i$ at a azimuthal angle $(\theta_i+\gamma)$ with respect to the perpendicular line L and is recorded in the noise area $NOI_{i'}$ at a azimuthal angle $(\theta_i-\gamma)$ with respect to the line L.

Figure 4:
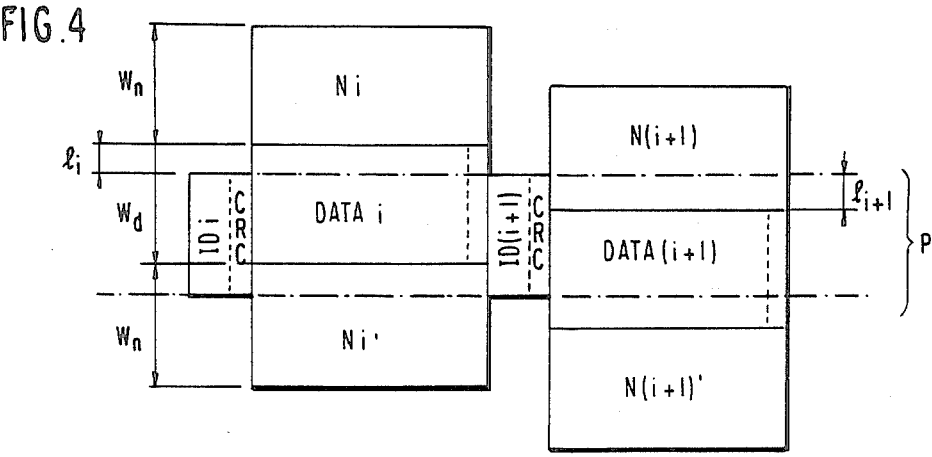

A data pattern for the data fields $D_i$ and a noise pattern for the noise fields $NOI_i$ and $NOI_{i'}$ are the same as those for the offset track shown in FIGS. 3 and 4.

FIGS. 10A to 10D show reading signals from the azimuth track read by the magnetic head with a azimuthal angle (H) with respect to the data field. As shown in FIG. 10A, the output level of the data signal from the data field $D_i$ is decreased in accordance with the increment of the azimuthal angle (H). The output level of the positive noise area $NOI_i$ is increased when the azimuthal angle (H) is positively increased, while it is decreased when the azimuthal angle (H) is negatively increased as shown in FIG. 10B. Conversely, the output level of the negative noise area $NOI_i'$ is decreased when the azimuthal angle (H) is positively increased, while it is increased when the azimuthal angle (H) is negatively increased as shown in FIG. 10C. The reading signal of the head has the wave form shown in FIG. 10D, which is obtained by compounding the data signal (FIG. 10A), the positive noise signal (FIG. 10B) and the negative noise signal (FIG. 10C). Due to the noise signals, the peak shift S' is obtained in greater value. Accordingly, the reading error is occurred by a smaller azimuthal angle of the magnetic head. On the other hand, the ID field $ID_i$ can be recognized even if the head has azimuthal angle in relatively large value since it has a width the same as the head read path P.

Figure 11:
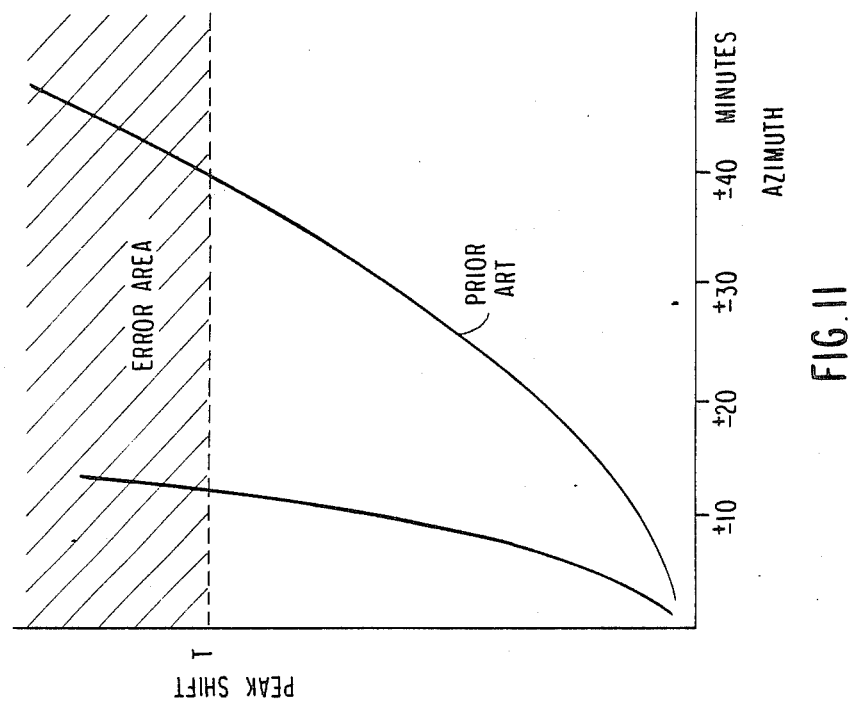
FIG. 11 illustrates a relationship between a azimuthal angle and a peak shift.

As shown in FIG. 11, the peak shift S' reaches the threshold level T of the peak shift when the azimuthal angle of the head is ±12 minutes by using the diagnostic disk having the azimuth track shown in FIG. 8. On the other hand, by using the conventional diagnostic disk, the amount of the azimuthal angle enabling the peak shift to be the threshold level T is ±40 minutes. It shows the azimuthally misalignment of the magnetic head can be detected with high precision by the azimuth track shown in FIG. 8.

Referring back to FIG. 1, the measurement of the amount of the track offset and azimuthal angle will be explained. The diagnostic disk 20 is set instead of the floppy disk 4. The computer 1 selects one of the progressive offset track (TRACK 0, 3, 38, 41, 70 or 73) or the azimuth track (TRACK 76). Then, the computer 1 indicates one of the sector numbers in turn. The read-/write circuit 13 sends a digital data recorded in the indicated sector. The digital data is compared with the predetermined data "100100 . . . " by the computer 1 to recognize the sector number of the sector whose data field is correctly read. The computer recognizes the amount of track offset and the azimuthal angle in accordance with the sector number of readable sectors and that of unreadable sectors.

What is claimed is:

1. In a diagnostic disk for checking an azimuthal alignment of a magnetic head of magnetic disk drive with respect to the standard head alignment, said diagnostic disk being driven by said magnetic disk drive with a radially central portion of said diagnostic disk as the center of rotation whereby a concentric ideal head read path is provided on a surface of said diagnostic disk by said standard head alignment, said diagnostic disk comprising a concentric checking track provided on said ideal head read path and divided in a plurality of sectors, each of said sectors including:
an identification field for recording a sector number identifying said sector, said identification field having substantially the same width as said ideal head read path in the radial direction of said diagnostic disk and said sector number being recorded at an angle perpendicular to said radial direction;
a data field for recording a predetermined data pattern, said data pattern being recorded at an first azimuthal angle with respect to said radial direction; and
noise areas for recording a predetermined noise pattern different from said data pattern, said noise areas being located at both sides of said data field in said radial direction, said noise pattern of one of said noise area being recorded at a second azimuthal angle inclining in the clockwise direction with respect to the perpendicular line to the recording direction of said data pattern, and said noise pattern of the other of said noise areas being recorded at a third azimuthal angle inclining in the counterclockwise direction with respect to said perpendicular line.

2. The diagnostic disk as claimed in claim 1, wherein the absolute value of said second azimuthal angle is the same as that of said third azimuthal angle.

3. The diagnostic disk as claimed in claim 1, wherein the sum of widths of said data field and said noise areas is the same as a width of said identification field in said radial direction.

4. The diagnostic disk as claimed in claim 1, wherein said plurality of sectors have respective data fields in which said data pattern is recorded at respective azimuthal angles different from each other.

5. The diagnostic disk as claimed in claim 1, wherein said plurality of sectors include even and odd sectors, said data pattern being recorded inclining in the clockwise direction with respect to said radial direction in the data field of one of said even and odd sectors, and in the counterclockwise direction with respect to said radial direction in the data field of the other of said even and odd sectors.

6. The diagnostic disk as claimed in claim 1, wherein said second and third azimuthal angles of said noise pattern with respect to said perpendicular line to the recording direction of said data pattern are constant for all of said plurality of sectors.

7. A method of checking an azimuthal alignment of a magnetic head of a magnetic disk drive with respect to the standard head alignment, said method comprising the steps of:
attaching a diagnostic disk on a rotary drive means of said magnetic disk drive, said diagnostic disk including a checking track which has a data field in which a signal having a predetermined data signal is recorded at a first azimuthal angle with respect to the radial direction of said diagnostic disk and noise areas in which noise signals having a predetermined noise pattern different from said data pattern are recorded, said noise areas being located both sides of said data field, said noise signal of one of said noise areas being recorded at a second azimuthal angle inclining in the clockwise direction with respect to the perpendicular line to the recording direction of said data pattern, and said noise signal of the other of said noise areas being recorded at a third azimuthal angle inclining the counterclockwise direction with respect to said perpendicular line;
rotating said diagnostic disk by said rotary drive means;
positioning a magnetic head of said magnetic disk drive on said checking track;
reading the data signal out of said data field in said checking tracks by means of said magnetic head, the read out data containing said noise signal from one of said noise areas when said magnetic head is misaligned; and
detecting whether said read out data signal contains a predetermined amount of said noise signal to determine the azimuthal deviation of said magnetic head with respect to said standard head alignment.

* * * * *